(No Model.)
S. F. ETTINGER.
PNEUMATIC TIRE.
No. 584,498. Patented June 15, 1897.
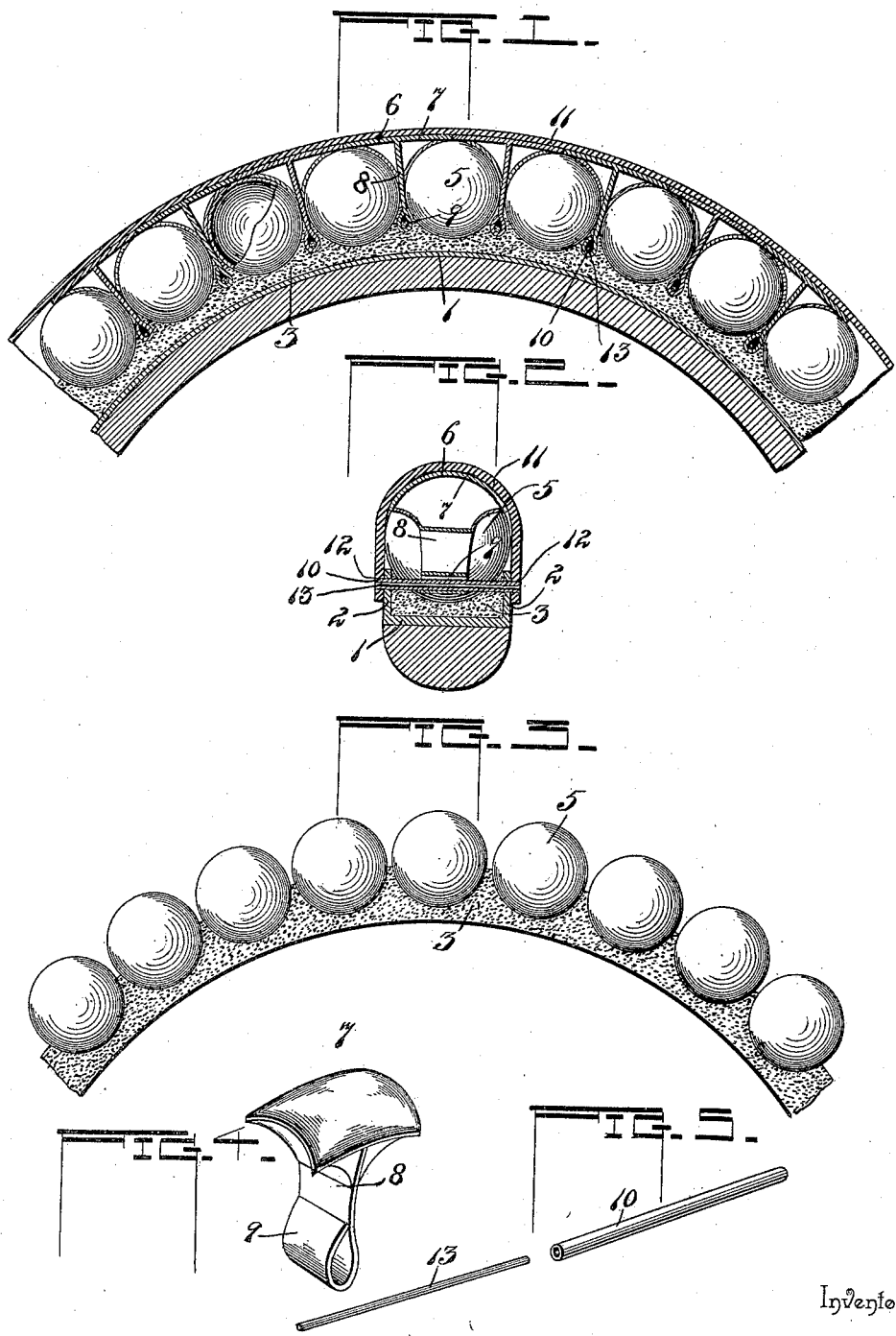
Witnesses
Milton O'Connell
R. M. Smith
Inventor
Samuel F. Ettinger,
By his Attorneys,
C A Snow & Co.

UNITED STATES PATENT OFFICE.

SAMUEL F. ETTINGER, OF LITTLE ROCK, ARKANSAS, ASSIGNOR OF ONE-HALF TO KATE FLEMING, OF SAME PLACE.

PNEUMATIC TIRE.

SPECIFICATION forming part of Letters Patent No. 584,498, dated June 15, 1897.

Application filed July 20, 1896. Serial No. 599,881. (No model.)

*To all whom it may concern:*

Be it known that I, SAMUEL F. ETTINGER, a citizen of the United States, residing at Little Rock, in the county of Pulaski and State of Arkansas, have invented a new and useful Pneumatic Tire, of which the following is a specification.

This invention relates to pneumatic tires, being especially designed for use upon bicycles and vehicles of like character.

The object of the invention is to provide in connection with a pneumatic tire an outer shoe or armor of metal or other puncture-proof material which will render impossible the puncturing of the inflatable portion of the tire, the said shoe or armor being sectional, so that as a whole it is flexible and yieldingly supported by the inflated part of the tire. An outer case of rubber or other flexible material is employed for covering such shoe or armor and preventing the ingress of foreign matter.

To the above end the invention consists in a pneumatic tire embodying certain novel features and details of construction and arrangement of parts, as hereinafter fully described, illustrated in the drawings, and pointed out in the claims.

In the accompanying drawings, Figure 1 is a longitudinal section through a portion of a wheel rim and tire constructed in accordance with this invention. Fig. 2 is a transverse section through the same. Fig. 3 is a side elevation of a fragmentary portion of the annular cushion and the attached inflated balls. Fig. 4 is a detail perspective view of one of the shoe or armor sections. Fig. 5 is a similar view of one of the double pins by which the shoe-section and outer case are secured to the rim.

Similar numerals of reference designate corresponding parts in the several figures of the drawings.

Referring to the drawings, 1 designates a wheel-rim, which may be of any desired material, having at its side edges circumferential flanges 2. Within said rim is seated an annular cushion 3 of some soft and flexible or resilient material, such as rubber. The outer surface of this cushion is provided with a longitudinal series of hemispheroidal recesses or concavities for the reception of a corresponding number of hollow balls 5, of rubber or analogous material. The balls 5 are inflated in any convenient manner and are attached to the cushion 3 by cementation or in any other convenient manner, so as to form a part of the cushion, being placed in position and removed therewith.

6 designates a circumferential shoe or armor composed of a series of independent sections 7. Each of said sections is provided with an inwardly-extending shank or web 8, at the inner end of which is a loop 9. The shank or web 8 passes between adjacent balls 5 and receives through its loop 9 a transverse hollow pin 10, by means of which the displacement of the shoe is prevented, while at the same time the inward yielding of the shoe is permitted by reason of the radial elongation of the loop 9 and the yielding of the cushion 3, against which the loop bears. The outer or tread portion of the shoe has a longitudinal curvature corresponding to the circumference of the tire and a transverse curvature corresponding approximately to the external surface or circumference of the inflated balls 5.

The meeting or adjacent edges of the shoe-sections may rest in contact with each other, or may overlap so as to break joints, or may be arranged in any suitable manner to prevent the puncturing of the balls.

The tire thus far constructed is incased and covered in by an outer case 11, of flexible material, such as rubber, and the edges of this case are perforated, as indicated at 12, to receive fastening-pins 13, which are inserted through the hollow pins 10, above referred to. The outer case 11 may, however, be secured to the rim in any convenient manner.

With a tire constructed as above described it is impossible to puncture the inflated portion thereof, thus adding to the comfort of the rider and obviating the expense of repairs. As each of the shoe-sections is independent of all the rest, it is obvious that the resiliency of the tire will not be materially affected.

It will be understood that the tire is susceptible of changes in the form, proportion, and minor details of construction, which may accordingly be resorted to without departing from the spirit or sacrificing any of the advantages of this invention.

Having thus described the invention, what is claimed as new is—

1. In a tire, the combination of a rim, a circumferential series of inflated balls seated in the rim, and a sectional armor-shoe covering the outer sides of the balls and consisting of a continuous series of duplicate shoe-sections resting in close contact with the spherical surfaces of the balls, substantially as set forth.

2. In a tire, the combination of a rim, a circumferential series of inflated balls seated in the rim, and an armor-shoe covering the outer sides of the balls and consisting of a continuous series of duplicate shoe-sections, each shoe-section lying in a plane between a pair of the balls and having a close registering contact with the spherical surfaces of such balls, substantially as set forth.

3. In a tire, a rim, a circumferential series of inflated balls seated in the rim, and a series of duplicate armor-shoe sections for the outer sides of the balls, each shoe-section having a close registering contact with the spherical surfaces of a pair of the balls and provided with a shank portion extended in the space between such balls and serving as a partition to separate them, substantially as set forth.

4. In a tire, the rim, a solid annular cushion-body surrounding the rim and provided in its outer surface with a continuous series of hemispherical recesses or seats, a circumferential series of inflated balls seated in said recesses or seats, and a series of duplicate armor-shoe sections for the outer sides of the balls, each shoe-section having a close registering contact with the spherical surfaces of a pair of the balls, substantially as set forth.

5. In a pneumatic tire, a rim having spaced circumferential flanges, in combination with a circumferential series of inflated balls seated therein, and a non-puncturable shoe covering said balls and composed of a plurality of sections each having an inwardly-projecting stem looped at its inner end to engage a transverse pin connected to the rim, substantially as described.

6. In a pneumatic tire, the combination with a rim having spaced circumferential flanges, of an inflatable tire seated in said rim, hollow pins passing transversely through the flanges of the rim for holding said tire in place, an outer case inclosing said tire, and pins passing through the edges of said outer case and also through the said hollow pins, whereby the outer case is secured to the rim, substantially as described.

In testimony that I claim the foregoing as my own I have hereto affixed my signature in the presence of two witnesses.

SAMUEL F. ETTINGER.

Witnesses:
RUFUS H. MILLS,
GEO. B. ALLIS.